(12) United States Patent
Abe

(10) Patent No.: US 10,705,564 B2
(45) Date of Patent: Jul. 7, 2020

(54) HOUSING AND ELECTRONIC DEVICE

(71) Applicant: Fujitsu Client Computing Limited, Kanagawa (JP)

(72) Inventor: Takashi Abe, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 16/418,681

(22) Filed: May 21, 2019

(65) Prior Publication Data

US 2020/0174521 A1 Jun. 4, 2020

(30) Foreign Application Priority Data

Nov. 30, 2018 (JP) .................................. 2018-224640

(51) Int. Cl.
G06F 1/16 (2006.01)

(52) U.S. Cl.
CPC .......... *G06F 1/1616* (2013.01); *G06F 1/1641* (2013.01); *G06F 1/1662* (2013.01)

(58) Field of Classification Search
CPC ..... G06F 1/1616; G06F 1/1641; G06F 1/1662
See application file for complete search history.

(56) References Cited

U.S. PATENT DOCUMENTS

| 8,675,373 | B2 * | 3/2014 | Kinjou | ................. | H01Q 1/2266 |
| | | | | | 361/679.01 |
| 9,176,524 | B2 * | 11/2015 | Kitamura | ............. | G06F 1/1637 |
| 9,354,662 | B2 * | 5/2016 | Ohishi | ................... | G06F 1/1637 |
| 2007/0285883 | A1 * | 12/2007 | Nakajima | ............... | G06F 1/162 |
| | | | | | 361/679.27 |
| 2007/0293005 | A1 * | 12/2007 | Shigenobu | ........... | G06F 1/1616 |
| | | | | | 438/238 |

(Continued)

FOREIGN PATENT DOCUMENTS

| JP | 2011138190 A | 7/2011 |
| JP | 2014123066 A | 7/2014 |

(Continued)

OTHER PUBLICATIONS

Notification of Reason for Refusal in corresponding Japanese application No. 2018-224640 dated Jan. 15, 2019 (8 pages).

(Continued)

*Primary Examiner* — Hoa C Nguyen
*Assistant Examiner* — Keith DePew
(74) *Attorney, Agent, or Firm* — Osha Liang LLP

(57) ABSTRACT

A housing according to one embodiment includes: a first member being part of an outer wall of the housing; a second member that is another part of the outer wall and includes a first portion overlapping with the first member in a first direction and being joined to the first member via an adhesive agent, and a second portion located at a different position from the first member in a second direction; a first positioning part that is provided at an edge of the first member and projects in the first direction, the edge being located in the second direction; a second positioning part into which the first positioning part is inserted, the second positioning part being provided at the first portion; and a first rib extending from the first positioning part along the edge and being interposed between the first member and the first portion.

9 Claims, 12 Drawing Sheets

(56) References Cited

U.S. PATENT DOCUMENTS

2011/0157788 A1\* 6/2011 Yanagida .............. G06F 1/1616
361/679.01
2011/0188224 A1\* 8/2011 Sugai ...................... H05K 7/02
361/807

FOREIGN PATENT DOCUMENTS

| JP | 2016158098 A | 9/2016 |
| JP | 2017204514 A | 11/2017 |

OTHER PUBLICATIONS

Decision to Grant a Patent in corresponding Japanese application No. 2018-224640 dated Mar. 26, 2019 (4 pages).

\* cited by examiner

US 10,705,564 B2

HOUSING AND ELECTRONIC DEVICE

CROSS-REFERENCE TO RELATED APPLICATIONS

This application is based upon and claims the benefit of priority from Japanese Patent Application No. 2018-224640, filed Nov. 30, 2018, the entire contents of which are incorporated herein by reference.

FIELD

The present disclosure relates to a housing and an electronic device.

BACKGROUND

There is known a housing of an electronic device in which a first member and a second member that form an outer wall of the housing are joined to each other with an adhesive agent.

In regard to such the housing, it is needed to obtain a new structure capable of suppressing leakage of the adhesive agent at a boundary part between the first member and the second member.

SUMMARY

According to one aspect of the present disclosure, a housing of an electronic device includes: a first member that is part of an outer wall of the housing; a second member that is another part of the outer wall and includes a first portion overlapping with the first member in a first direction intersecting with the outer wall, the first portion being joined to the first member via an adhesive agent, and a second portion being located at a different position from the first member in a second direction intersecting with the first direction; a first positioning part that is provided at an edge of the first member and projects in the first direction, the edge being located in the second direction on the first member; a second positioning part into which the first positioning part is inserted, the second positioning part being provided at the first portion of the second member; and a first rib that extends from the first positioning part along the edge of the first member, the first rib being interposed between the first member and the first portion of the second member.

According to another aspect of the present disclosure, an electronic device includes: a first housing that is the above-mentioned housing; a second housing that is provided with a display screen and is supported to allow rotating on rotation centers to the first housing between a first position and a second position, the first position being a position in which the display screen faces the first housing, the second position being a position in which the display screen faces an opposite side to the first housing; and an antenna that is provided in the second housing and is disposed to overlap with the first member in the first direction in a state where the second housing is in the second position, wherein the first member is made of a synthetic resin material.

DETAILED DESCRIPTION

Figure 1:
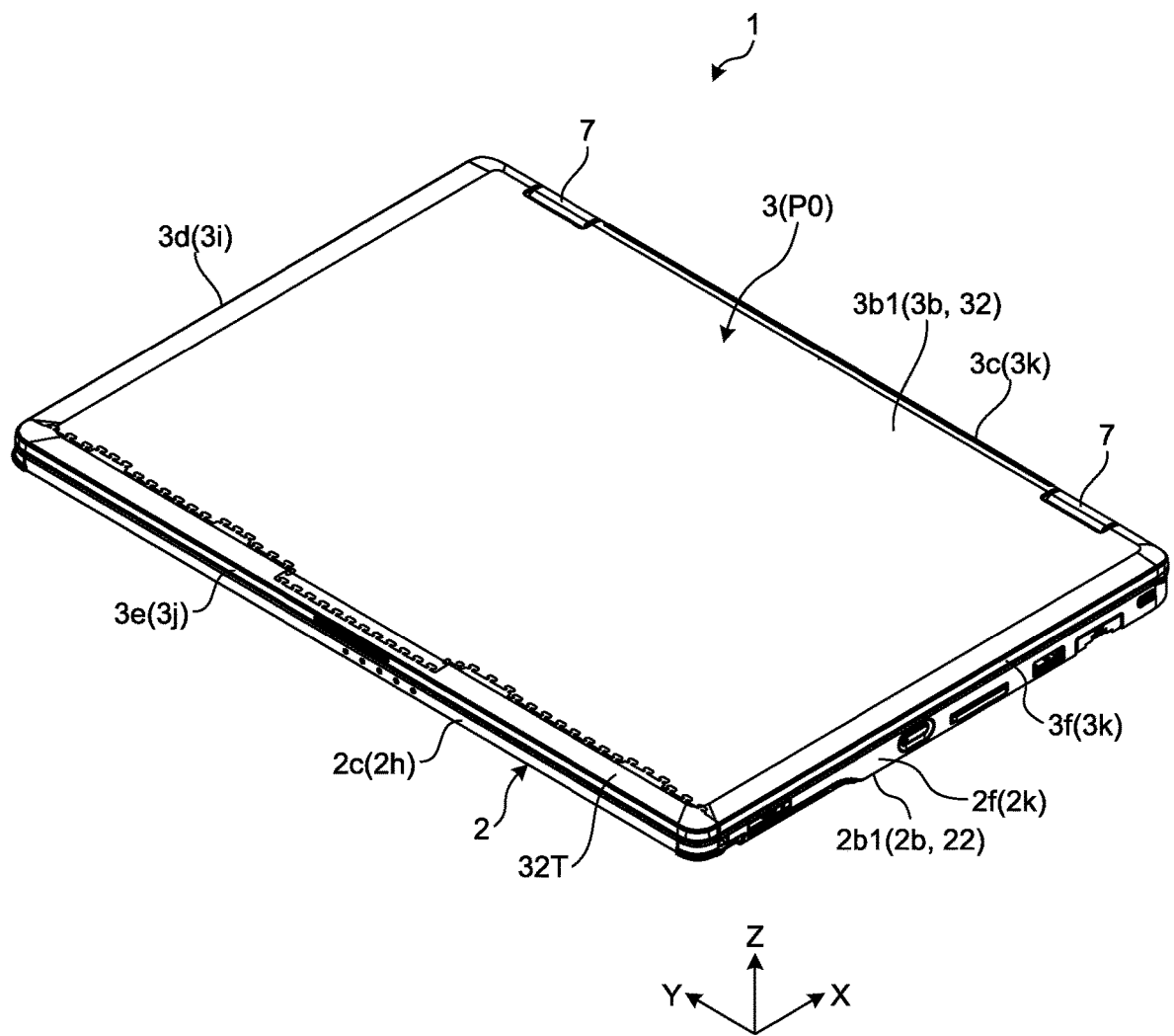
FIG. 1 is an explanatory perspective view from the front side of an electronic device of an embodiment and is a diagram of a state in which a display housing is set at a closed position.

Hereinafter, an explanatory embodiment and modifications of the present disclosure will be described. The configurations of the following embodiment and modifications, as well as the functions and effects provided by the configurations are merely examples. The present disclosure may be implemented by a structure other than that disclosed in the following embodiment and modifications. Moreover, with the present disclosure, it is possible to obtain at least one of various effects (including secondary effects) obtained by the configurations.

Moreover, similar components are included in the following embodiment and modifications. Consequently, in the following, the same reference numerals denote the same components, and the description thereof will not be repeated. Furthermore, in the present specification, ordinal numbers are only used to distinguish parts, members, regions, positions, directions, and the like, and are not intended to indicate order or priority.

EMBODIMENT

Figure 2:
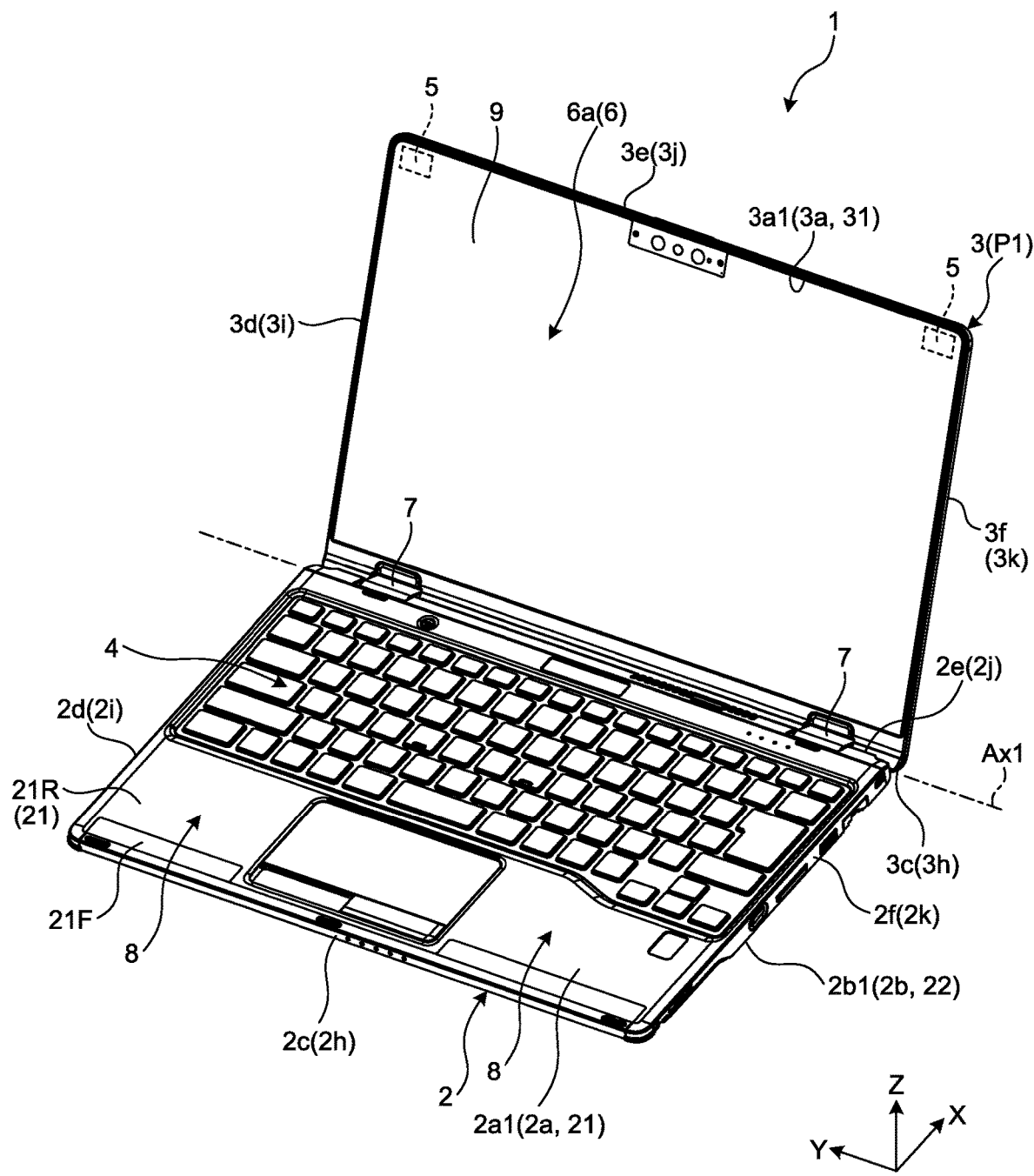
FIG. 2 is an explanatory perspective view from the front side of the electronic device of the embodiment and is a diagram of a state in which the display housing is set at a first developing position.

FIG. 1 is a perspective view from the front side of an electronic device 1, and is a diagram of a state in which a display housing 3 is set at a closed position P0. FIG. 2 is a perspective view from the front side of the electronic device 1, and is a diagram of a state in which the display housing 3 is set at a first developing position P1. In the following explanation, three directions orthogonal to each other are defined for convenience sake. The X direction is a direction along the depth (front and rear direction) of a base housing 2. The Y direction is a direction along the width (horizontal direction, longitudinal direction) of the base housing 2. The Z direction is a direction along the thickness (vertical direction) of the base housing 2. The Z direction is an example of the "first direction", and the X direction is an example of the "second direction". In the following explanation, the X direction may be referred to as a rear side, and a direction opposite to the X direction may be referred to as a front side. The Y direction may be referred to as a left side, and a direction opposite to the Y direction may be referred to as a right side. The Z direction may be referred to as an upper side, and a direction opposite to the Z direction may be referred to as a lower side.

As illustrated in FIG. 1 and FIG. 2, for example, the electronic device 1 is a clamshell type (notebook type) personal computer, and includes the base housing 2 and the display housing 3. A keyboard 4 (input device), a substrate, which is not illustrated, and the like are stored in the base housing 2. An antenna unit 5, a display unit 6, and the like are stored in the display housing 3. The base housing 2 is an example of the "housing" or the "first housing", and the display housing 3 is an example of the "second housing". Note that the electronic device 1 is not limited to the above-mentioned example, and the electronic device 1 may be configured as various electronic devices 1 each provided with the antenna unit 5, such as a desktop type personal computer, a video display device, a television receiver, a game machine, a video display control device, an information storage device, and the like.

The base housing 2 includes an upper surface 2a1 where the keyboard 4 is exposed, and a lower surface 2b1 that faces a side opposite to the upper surface 2a1. The keyboard 4 is supported by the base housing 2 so that the keyboard 4 can be operated from the upper side. Moreover, a substrate mounted with a plurality of electronic parts such as a central processing unit (CPU), a read only memory (ROM), a random access memory (RAM), and the like is provided inside the base housing 2. At least part of a control circuit of the electronic device 1 is formed by the wirings in the substrate and the electronic parts.

The display housing 3 includes a front surface 3a1 where a display screen 6a of the display unit 6 is exposed and a rear surface 3b1 that faces a side opposite to the front surface 3a1. The display unit 6 is supported by the display housing 3 in a state that the display screen 6a can be viewed from the front side. Moreover, a part of the front surface 3a1 and the display screen 6a are covered by a transparent part of a touch panel 9.

The antenna unit 5 is provided at two corners of an upper edge 3j of the display housing 3. Each antenna unit 5 is electrically connected to a communication chip of the substrate via a cable. The antenna unit 5 is an example of the "antenna", which may be, for example, a diversity antenna. The present embodiment is capable of improving the quality and reliability of communication, by preferentially using a signal of the antenna unit 5 having a better radio wave state among the same wireless signals received by a plurality of the antenna units 5, and by removing noise by combining the received signals. The antenna unit 5 is not limited to this example, and the antenna unit 5 may be provided at only one corner.

Figure 3:
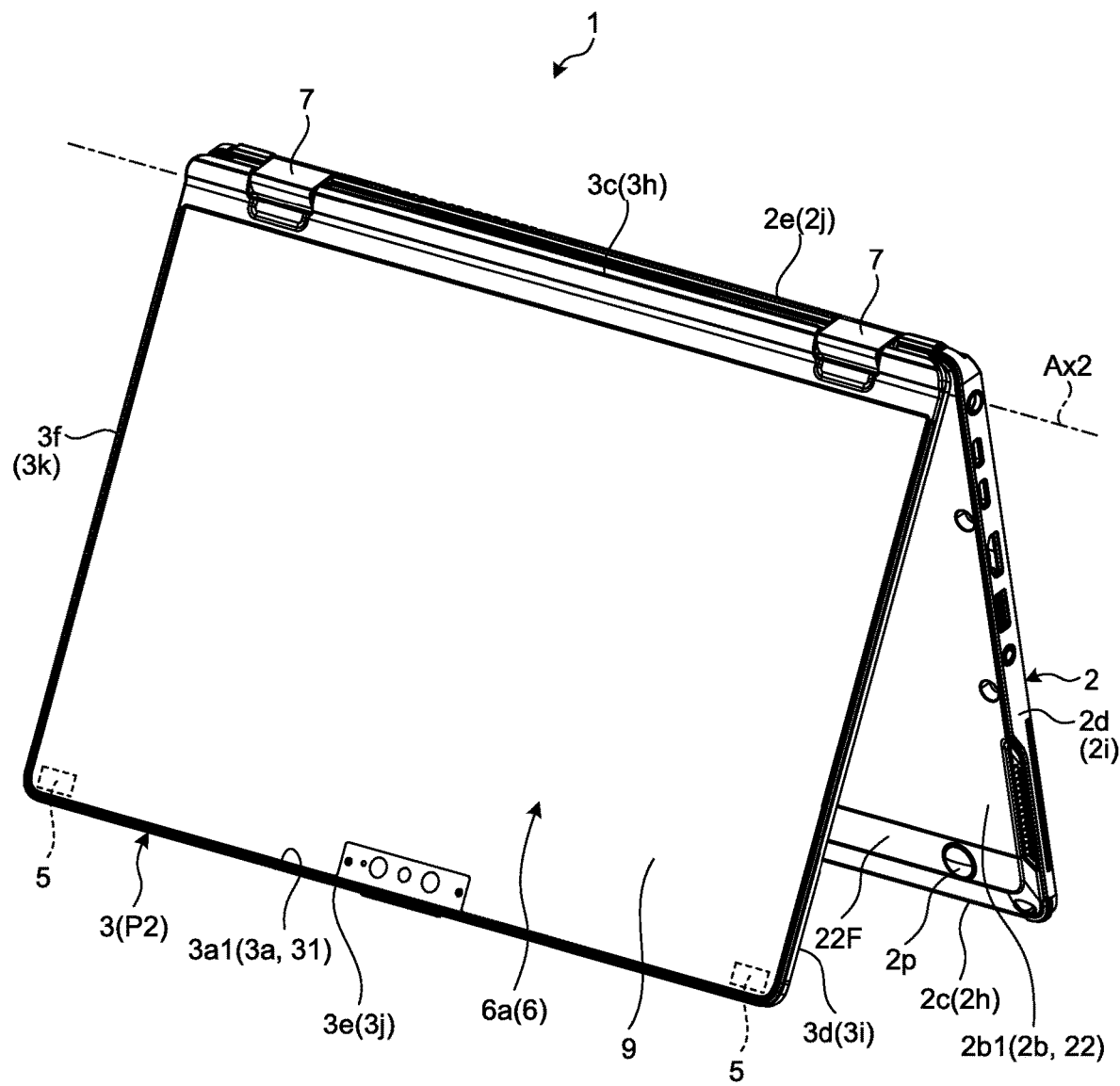
FIG. 3 is an explanatory perspective view from the rear side of the electronic device of the embodiment and is a diagram of a state in which the display housing is set at a second developing position.
Figure 4:
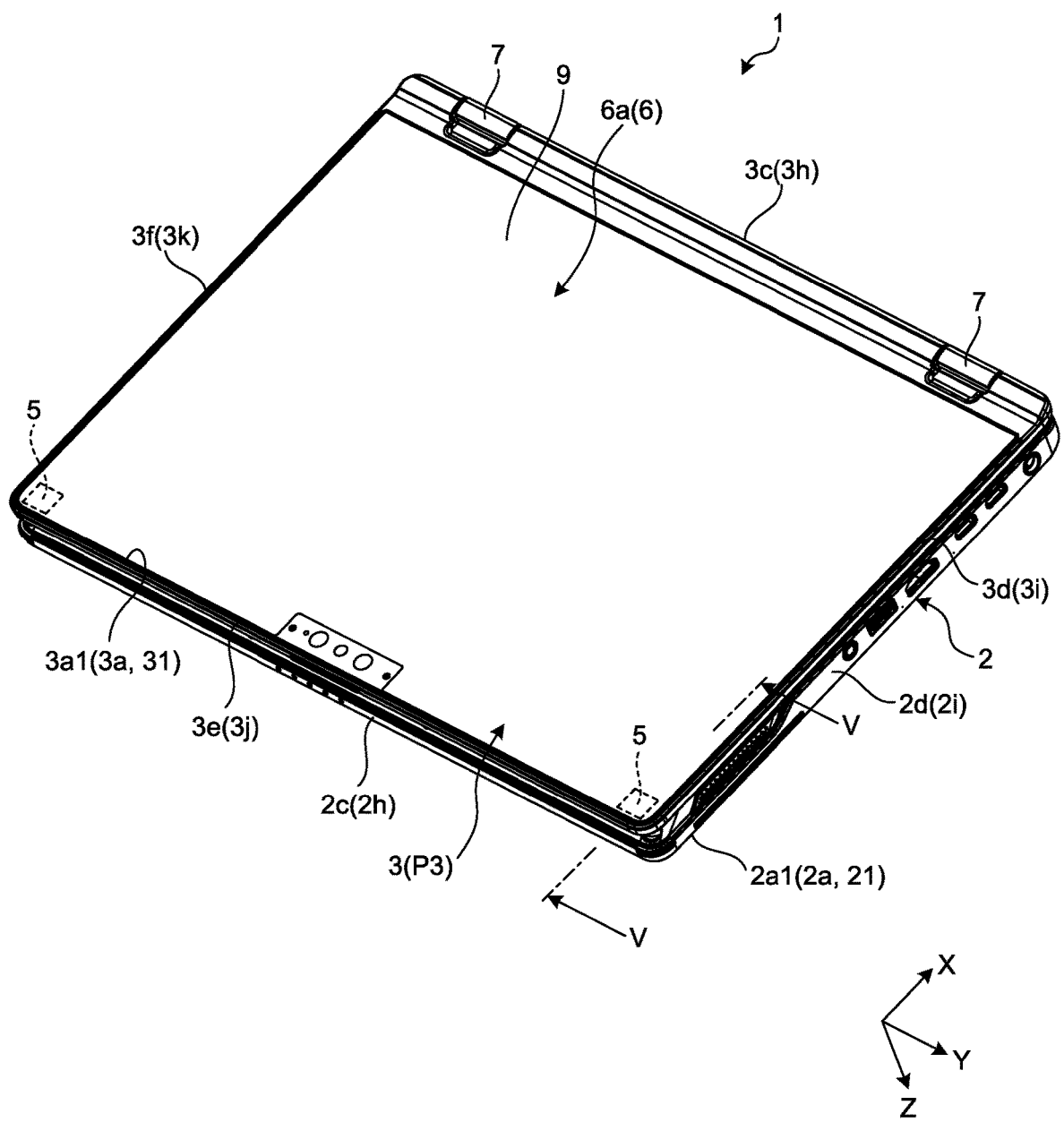
FIG. 4 is an explanatory perspective view from the rear side of the electronic device of the embodiment and is a diagram of a state in which the display housing is set at a third developing position.

FIG. 3 is a perspective view from the rear side of the electronic device 1 and is a diagram of a state in which the display housing 3 is set at a second developing position P2. FIG. 4 is a perspective view from the rear side of the electronic device 1 and is a diagram of a state in which the display housing 3 is set at a third developing position P3. In the present embodiment, the electronic device 1 can be used in multiple modes such as a notebook mode illustrated in FIG. 2, a tent mode (stand mode) illustrated in FIG. 3, a slate mode (tablet mode) illustrated in FIG. 4, and the like.

More specifically, the display housing 3 is supported by the base housing 2 via a hinge 7 to allow rotating. The hinge 7 has two rotation centers Ax1 and Ax2 (rotational axes) that extend in the Y direction. The display housing 3 is able to move among the closed position P0 (FIG. 1), the first developing position P1 (FIG. 2), the second developing position P2 (FIG. 3), and the third developing position P3 (FIG. 4) by rotating on the rotation centers Ax1 and Ax2 of the hinge 7.

As illustrated in FIG. 1, in a state where the display housing 3 is set at the closed position P0, the upper surface 2a1 of the base housing 2 and the keyboard 4 face the front surface 3a1 of the display housing 3 and the display screen 6a of the display unit 6. Thus, at the closed position P0, the keyboard 4, the touch panel 9, and the like cannot be operated, because the keyboard 4, the touch panel 9, and the like are hidden by the base housing 2 and the display housing 3. The closed position P0 is an example of the "first position". Moreover, the closed position P0 may be referred to as an initial position, a first folding position, and the like.

As illustrated in FIG. 2, in a state in which the display housing 3 is set at the first developing position P1, the upper surface 2a1 and the keyboard 4 do not face the front surface 3a1 and the display screen 6a, and the upper surface 2a1, the keyboard 4, the front surface 3a1, and the display screen 6a are exposed. For example, the rotation angle of the display housing 3 relative to the base housing 2 at the first developing position P1 is from 90 degrees to 170 degrees. At the first developing position P1, the electronic device 1 is used as what is called a notebook mode, and the electronic device 1 is operated by the keyboard 4 in a state in which the base housing 2 is mounted on a mounting part such as a desk and a table, which are not illustrated. The first developing position P1 is also referred to as a first usage position and the like.

As illustrated in FIG. 3, in a state in which the display housing 3 is set at the second developing position P2, the upper surface 2a1 and the keyboard 4 face a side opposite to the front surface 3a1 and the display screen 6a. For example, the rotation angle of the display housing 3 relative to the base housing 2 at the second developing position P2 is from 270 degrees to 350 degrees. At the second developing position P2, the electronic device 1 is used as what is called a tent mode (stand mode), and the electronic device 1 is operated by the touch panel 9 in a state in which the base housing 2 and the display housing 3 stand on the mounting part, which is not illustrated. The second developing position P2 is also referred to as a second usage position and the like.

Moreover, as illustrated in FIG. 4, the upper surface 2a1 and the keyboard 4 also face a side opposite to the front surface 3a1 and the display screen 6a, in a state in which the display housing 3 is set at the third developing position P3. The rotation angle of the display housing 3 relative to the base housing 2 at the third developing position P3 is 360 degrees. At the third developing position P3, the electronic device 1 is used as what is called a slate mode (tablet mode), and the electronic device 1 is operated by the touch panel 9 in a state in which the base housing 2 is mounted on the mounting part, which is not illustrated, or in a state in which the base housing 2 is lifted from the mounting part. The third developing position P3 is an example of the "second position".

Note that the third developing position P3 is not limited to this example, and for example, the display screen 6a of the display housing 3 may be overlapped so that the display screen 6a faces a side opposite to the upper surface 2a1 at the upper surface 2a1 side of the base housing 2, by a hinge having two rotation centers that intersect with (are orthogonal to) each other. The third developing position P3 may be referred to as a third usage position, a second folding position, and the like.

As illustrated in FIG. 1 to FIG. 4, for example, the display housing 3 is formed in a rectangular parallelepiped shape that is flat in one direction (Z direction in FIG. 1). The display housing 3 includes a front wall 3a, a rear wall 3b, a plurality of side walls 3c to 3f, and the like. The front wall 3a includes the front surface 3a1, and the rear wall 3b includes the rear surface 3b1. The front wall 3a is formed in a square frame shape, and the rear wall 3b is formed in a square plate shape.

As illustrated in FIG. 2, the side wall 3c and the side wall 3e respectively configure a lower edge 3h and the upper edge 3j of the display housing 3. The lower edge 3h is adjacent (placed close) to the rotation centers Ax1 and Ax2 of the hinge 7. The upper edge 3j is separated from the rotation centers Ax1 and Ax2 of the hinge 7 than the lower edge 3h. Moreover, the side wall 3d and the side wall 3f respectively configure a left edge 3i and a right edge 3k of the display housing 3.

Moreover, the display housing 3 is formed by combining a plurality of parts (divided bodies). More specifically, for example, the display housing 3 includes a front cover 31 and a rear cover 32. The front cover 31 includes the front wall 3a and a part of each of the side walls 3c to 3f. The rear cover 32 includes the rear wall 3b and a part of each of the side walls 3c to 3f. The front cover 31 and the rear cover 32 are joined to each other by a clip, a screw, and the like.

As illustrated in FIG. 1 to FIG. 4, for example, the base housing 2 is formed in a rectangular parallelepiped box shape that is flat in the Z direction. The base housing 2 includes a plurality of wall parts such as an upper wall 2a, a lower wall 2b, a front wall 2c, a left wall 2d, a rear wall 2e, and a right wall 2f. The front wall 2c, the left wall 2d, the rear wall 2e, and the right wall 2f are also referred to as a side wall, a peripheral wall, an end wall, and the like.

The upper wall 2a and the lower wall 2b extend in a direction orthogonal to the Z direction (XY plane), and are provided in parallel with each other at an interval in the Z direction. The upper wall 2a includes the upper surface 2a1, and the lower wall 2b includes the lower surface 2b1. The lower surface 2b1 is provided with a plurality of support parts 2p (see FIG. 3) that support the base housing 2 in a state such that the base housing 2 is separated from the mounting part, which is not illustrated. Each of the support parts 2p may be referred to as a leg, a rubber leg, and the like. The lower wall 2b is an example of the "outer wall".

The front wall 2c and the rear wall 2e extend in a direction orthogonal to the X direction (YZ plane), and are provided in parallel with each other at an interval in the X direction. The front wall 2c is formed across the edges of the upper wall 2a and the lower wall 2b in a direction opposite to the X direction. The rear wall 2e is formed across the edges of the upper wall 2a and the lower wall 2b in the X direction.

The front wall 2c and the rear wall 2e respectively configure a front edge 2h and a rear edge 2j of the base housing 2. The front edge 2h is separated from the rotation centers Ax1 and Ax2 of the hinge 7. The rear edge 2j is adjacent (close) to the rotation centers Ax1 and Ax2 of the hinge 7 than the front edge 2h.

The left wall 2d and the right wall 2f both extend in a direction orthogonal to the Y direction (XZ plane), and are provided in parallel with each other at an interval in the Y direction. The left wall 2d is formed across the edges of the upper wall 2a and the lower wall 2b in the Y direction. The right wall 2f is formed across the edges of the upper wall 2a and the lower wall 2b in a direction opposite to the Y direction. The left wall 2d and the right wall 2f respectively configure a left edge 2i and a right edge 2k of the base housing 2.

Moreover, the base housing 2 is formed by combining plural parts (divided bodies). More specifically, for example, the base housing 2 includes a top cover 21 and a bottom cover 22. The top cover 21 includes the upper wall 2a, and a part of each of the front wall 2c, the left wall 2d, the rear wall 2e, and the right wall 2f. The bottom cover 22 includes the lower wall 2b, and a part of each of the front wall 2c, the left wall 2d, the rear wall 2e, and the right wall 2f. The top cover 21 and the bottom cover 22 are joined to each other by a clip, a screw, and the like.

Figure 5:
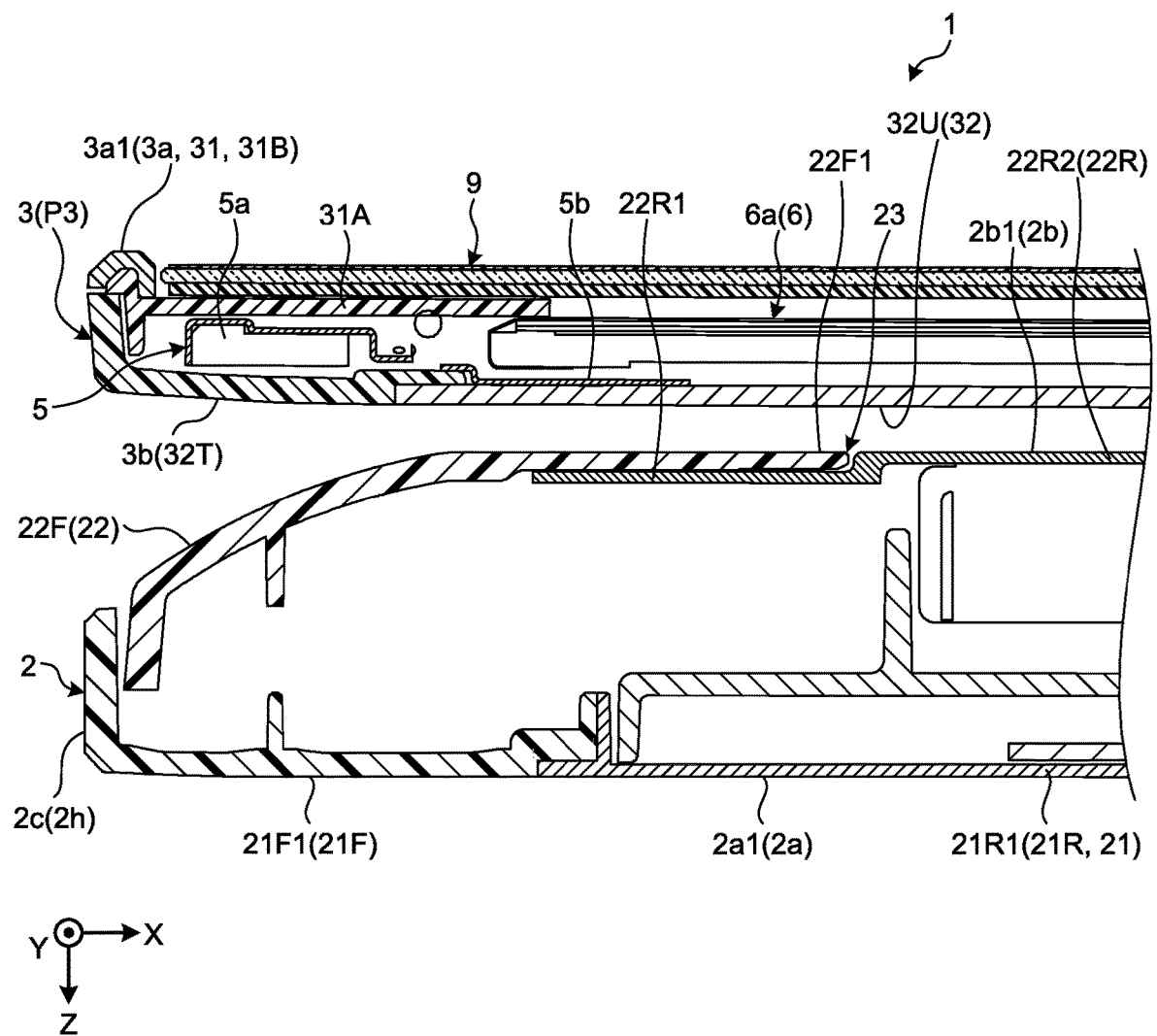
FIG. 5 is a cross section V-V for FIG. 4.

FIG. 5 is a cross section V-V for FIG. 4. As illustrated in FIG. 5, the front cover 31 and the rear cover 32 of the display housing 3 respectively include first members 31A and 32T, and second members 31B and 32U. The first members 31A and 32T, and the second members 31B and 32U are made of different materials from each other. A first material that forms the first members 31A and 32T is a synthetic resin material. A second material that forms the second members 31B and 32U is a metal material such as magnesium base alloy. For example, the first members 31A and 32T, and the second members 31B and 32U are manufactured by insert molding (hybrid molding) and the like, and are joined (integrated) to each other.

The first members 31A and 32T are overlapped with an antenna 5a of the antenna unit 5 in the thickness direction (Z direction in FIG. 5) of the display housing 3. The first members 31A and 32T are made of a synthetic resin material. Consequently, the antenna 5a can transmit and receive radio waves via the first members 31A and 32T. For example, the antenna 5a is used for a wireless local area network (LAN). Note that the antenna 5a may be an antenna used other than for the wireless LAN. The antenna 5a is made of a metal material.

The antenna unit 5 also includes a connection member 5b. The connection member 5b is formed in a plate shape including a plurality of bent portions, and extends from the antenna 5a. The connection member 5b is made of a metal material. The connection member 5b is fixed to the second member 32U by an aluminum tape and the like, while coming into contact with the inner surface of the second member 32U of the rear cover 32. Consequently, the antenna 5a and the second member 32U are electrically connected via the connection member 5b, and the second member 32U functions as a ground member of the antenna 5a.

As illustrated in FIG. 5, the top cover 21 and the bottom cover 22 of the base housing 2 respectively include first members 21F and 22F, and second members 21R and 22R. The first members 21F and 22F, and the second members 21R and 22R are made of different materials from each other. The first material that forms the first members 21F and 22F is a synthetic resin material. The second material that forms the second members 21R and 22R is a metal material such as magnesium based alloy. For example, the first member 21F and the second member 21R are manufactured by insert molding (hybrid molding) and the like, and are joined (integrated) to each other.

The first members 21F and 22F, and the second members 21R and 22R are arranged in the X direction. In other words, the second members 21R and 22R are placed away from the front edge 2h than the first members 21F and 22F. In the present embodiment, the first members 21F and 22F are overlapped with the antenna 5a in the Z direction, in a state in which the display housing 3 is set at the third developing position P3. Consequently, even when the display housing 3 is used at the third developing position P3, the antenna 5a can transmit and receive radio waves via the first members 21F and 22F made of a synthetic resin material. In FIG. 5, illustrations of a boss part 24, a rib 26, an adhesive agent 50, and the like, which will be described below, of the bottom cover 22 are omitted for convenience sake.

Figure 6:
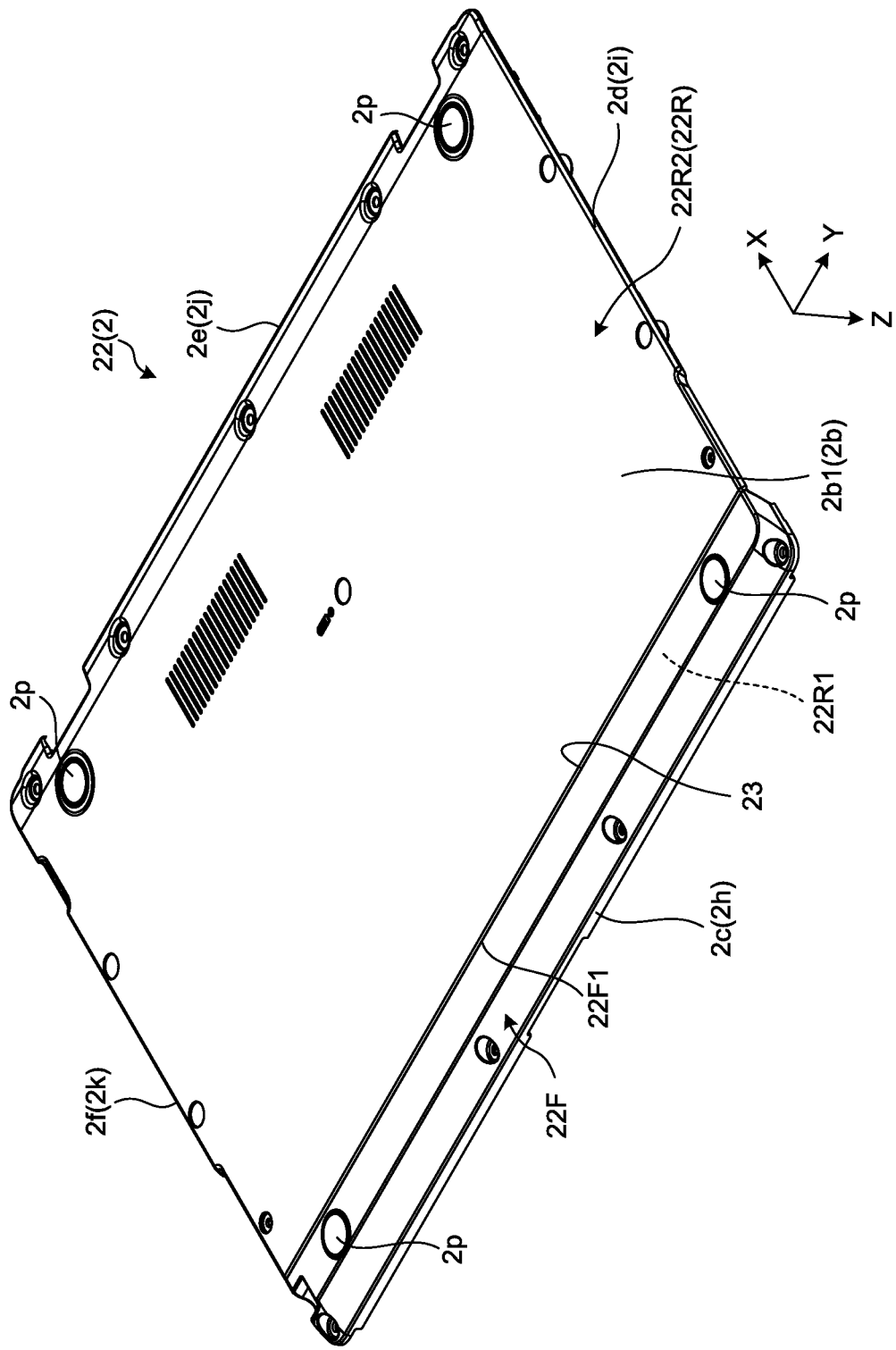
FIG. 6 is an explanatory perspective view from the outer surface side of a bottom cover of the electronic device of the embodiment.
Figure 7:
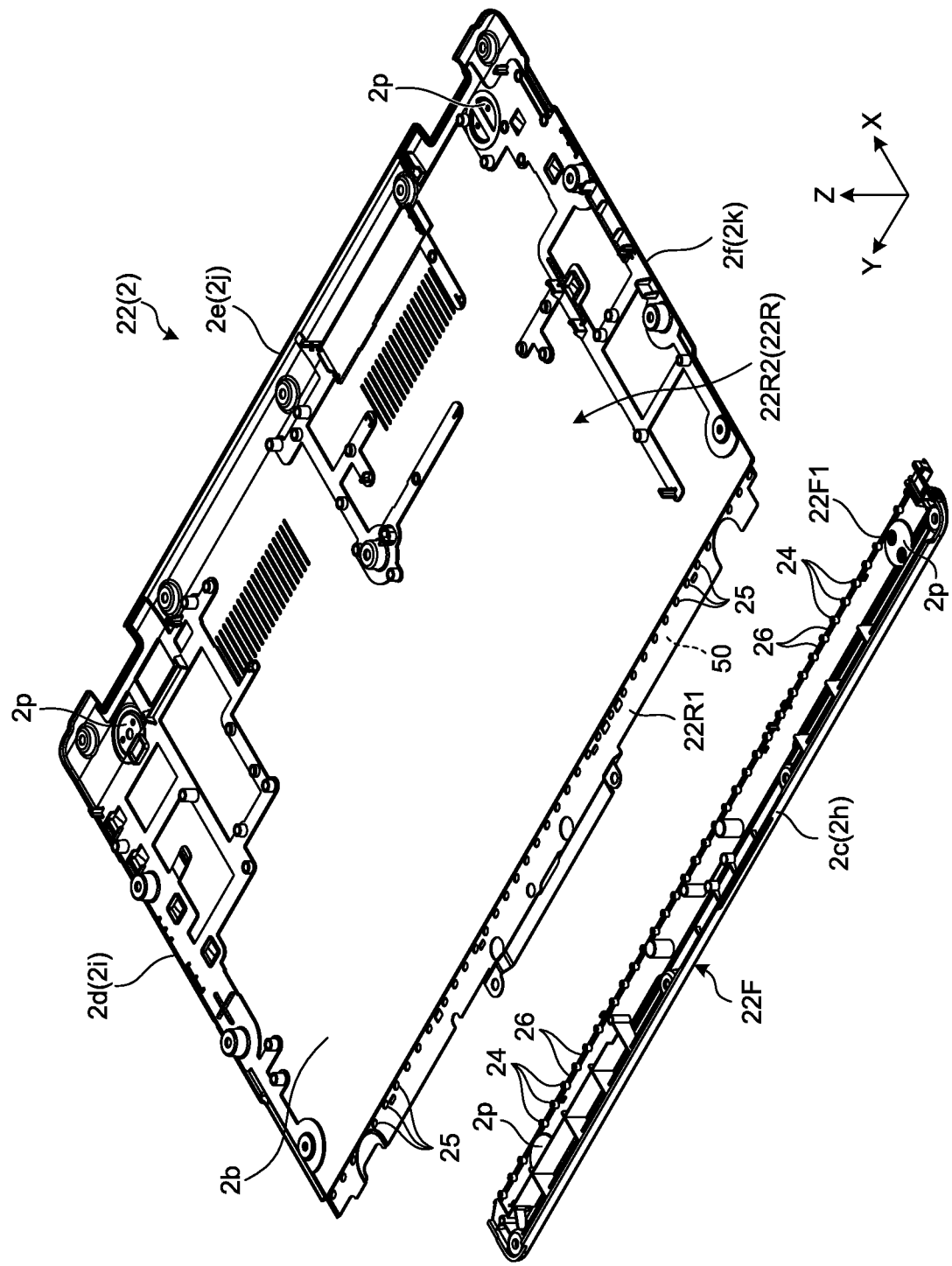
FIG. 7 is an explanatory exploded perspective view from the inner surface side of the bottom cover of the electronic device of the embodiment.
Figure 8:
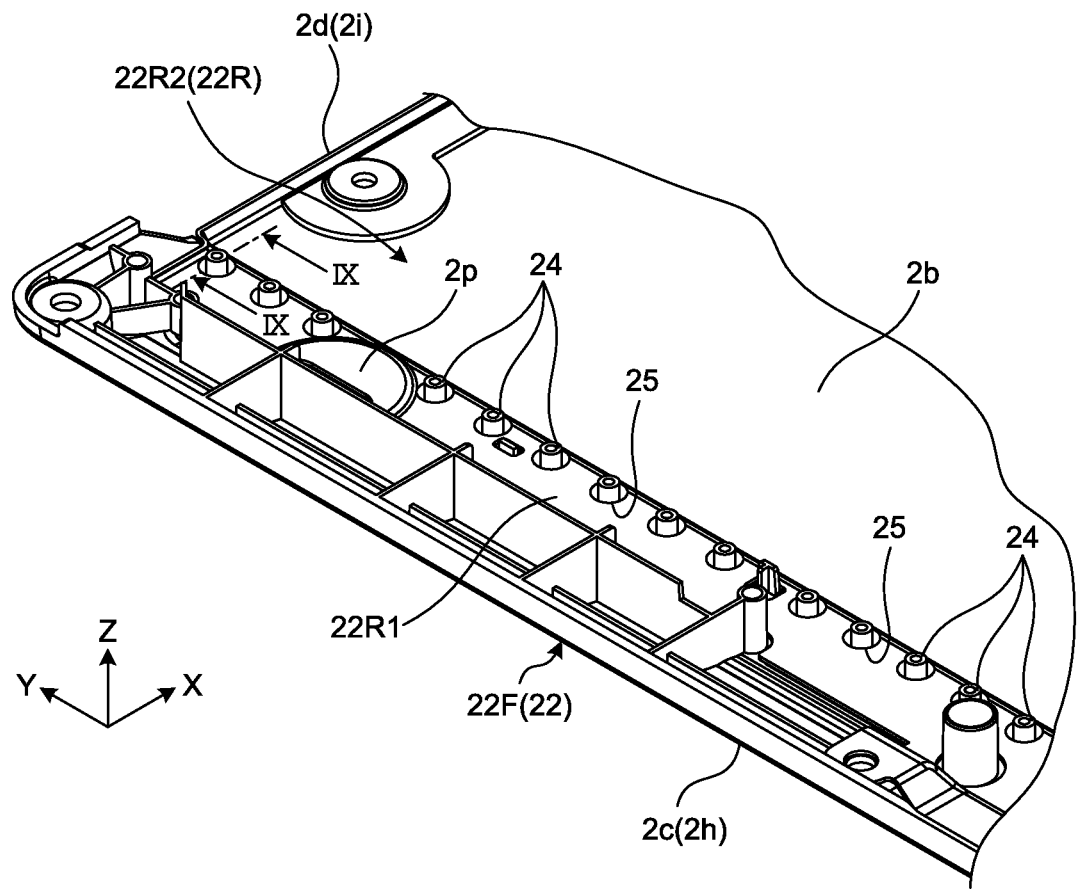
FIG. 8 is an enlarged view of a part of FIG. 7 and is a diagram of a state in which first positioning parts are individually inserted into second positioning parts.
Figure 9:
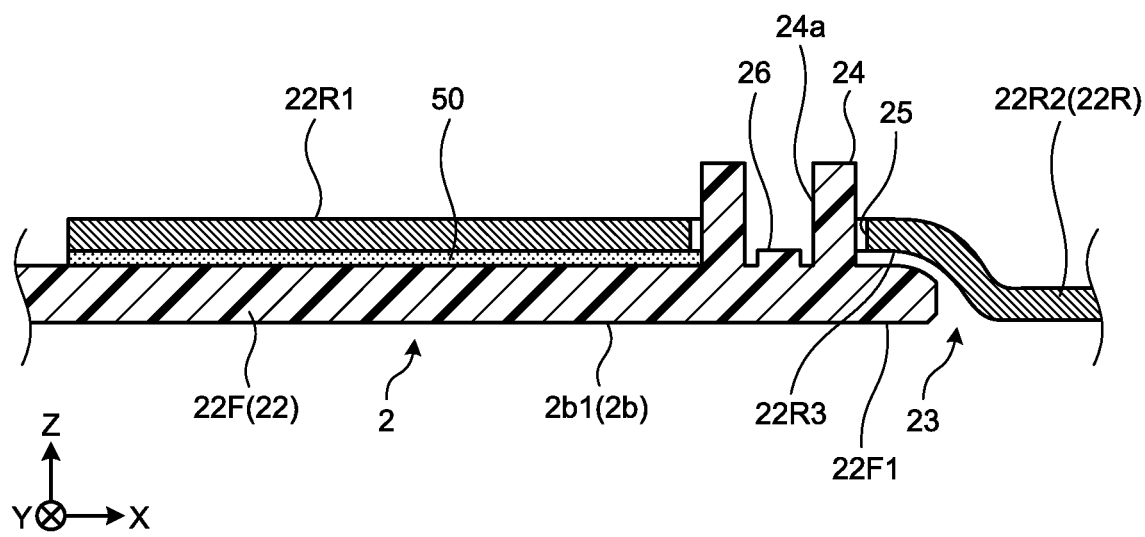
FIG. 9 is a cross section IX-IX for FIG. 8.

Next, the bottom cover 22 will be described in detail. FIG. 6 is a perspective view from the outer surface (lower surface 2b1) side of the bottom cover 22. FIG. 7 is an exploded perspective view from the inner surface side of the bottom cover 22. FIG. 8 is an enlarged view of a part of FIG. 7 and is a diagram of a state in which boss parts 24 are individually inserted into opening parts 25. FIG. 9 is a cross section IX-IX for FIG. 8.

As illustrated in FIG. 6 to FIG. 9, the bottom cover 22 is integrated in a state where the first member 22F and the second member 22R are partially overlapped with each other in the Z direction. In other words, the second member 22R includes a first portion 22R1 overlapped with the first member 22F in the Z direction, and a second portion 22R2 being in a different position from the first member 22F in the X direction. The first portion 22R1 is overlapped with the first member 22F in the base housing 2.

The first portion 22R1 forms an edge (side part) of the second member 22R in a direction opposite to the X direction. The opening parts 25 (see FIG. 7) are provided on the first portion 22R1 at an interval from each other in the Y direction. Each of the opening parts 25 is a round hole that penetrates through the first portion 22R1 in the Z direction.

The boss part 24 of the first member 22F (see FIG. 8 and FIG. 9) is inserted into the opening part 25. In the present embodiment, the movement of the first member 22F relative to the second member 22R in the XY plane is restricted by the abutment of the edge part of the opening part 25 and the outer peripheral surface of the boss part 24. The boss part 24 is an example of the "first positioning part", and the opening part 25 is an example of the "second positioning part". Note that the second positioning part is not limited to this example. Alternatively, the second positioning part may be a concave part that is opened toward the boss part 24 and is capable of enveloping the boss part 24 being a convex part.

As illustrated in FIG. 9, the second portion 22R2 is disposed offset with respect to the first portion 22R1 in a direction opposite to the Z direction. In other words, a concave part 22R3 recessed in the Z direction is provided between the second portion 22R2 and the first portion 22R1. An edge 22F1 of the first member 22F in the X direction is stored in the concave part 22R3. The outer surface (lower surface 2b1) of the second portion 22R2 and the outer surface (lower surface 2b1) of the first member 22F are arranged side by side on the same surface in the X direction. The concave part 22R3 is also referred to as a step.

Moreover, as illustrated in FIG. 7, the second portion 22R2 forms almost the entire area of the second member 22R excluding the first portion 22R1. The second portion 22R2 spreads along the XY plane and is formed in a rectangular plate shape horizontally long in the Y direction. A plurality of parts is mounted on the inner surface of the second portion 22R2.

Moreover, two of the support parts 2p (rubber legs) described above are provided on the outer surface of the second portion 22R2, in other words, the lower surface 2b1 (see FIG. 6). The support parts 2p are disposed at two corners of the rear edge 2j in the second portion 22R2. For example, the second member 22R is made of a metal material such as magnesium based alloy.

The first member 22F is disposed at a direction opposite to the X direction of the second member 22R. The first member 22F forms the lower wall 2b of the base housing 2 with the second member 22R. Moreover, the first member 22F forms the front edge 2h of the base housing 2.

As illustrated in FIG. 7, the boss parts 24 are provided on the inner surface of the first member 22F at an interval from each other in the Y direction. The boss parts 24 are disposed on the edge 22F1 of the first member 22F in the X direction, and project from the first member 22F in the Z direction. Each of the boss parts 24 is formed in a cylindrical shape along the edge part of the opening part 25. Note that the first positioning part is not limited to the boss part 24, and may be a column-shaped pin and the like.

Moreover, ribs 26 are provided on the inner surface of the first member 22F. The ribs 26 project from the first member 22F in the Z direction, and extend in the Y direction. In the present embodiment, the individual boss parts 24 and the individual ribs 26 are alternately provided along the edge 22F1 (Y direction).

Each of the ribs 26 is formed across the two boss parts 24 adjacent in the Y direction. In other words, the rib 26 is connected to the outer peripheral surface of the boss part 24. In the present embodiment, the rib 26 is also provided in a center hole 24a (see FIG. 9) of the boss part 24, and is connected to the inner peripheral surface of the boss part 24. The rib 26 may be formed by a single rib 26 that extends along the edge 22F1. The rib 26 is an example of the "first rib".

The remaining two of the support parts 2p (rubber legs) described above are provided on the outer surface of the first member 22F, in other words, on the lower surface 2b1 (see FIG. 6). The support parts 2p are disposed at two corners of the front edge 2h. For example, the first member 22F is made of a synthetic resin material such as polycarbonate (PC) plus acrylonitrile butadiene styrene (ABS) resin (what is called polymer alloy consisting of ABS resin and polycarbonate).

In the example of the present embodiment, the first member 22F and the first portion 22R1 of the second member 22R are provided at positions corresponding to a palm rest part 8 (see FIG. 2) of the base housing 2. The palm rest part 8 is a portion on which a user places his/her hand, when the display housing 3 is used at the first developing position P1. Consequently, load is applied from a user on the first member 22F and the first portion 22R1. Thus, in the present embodiment, the joining strength between the first member 22F and the second member 22R is increased, by joining the first member 22F and the first portion 22R1 with a hooking part 24b (see FIG. 11) and the adhesive agent 50, which will be described below.

Figure 10:
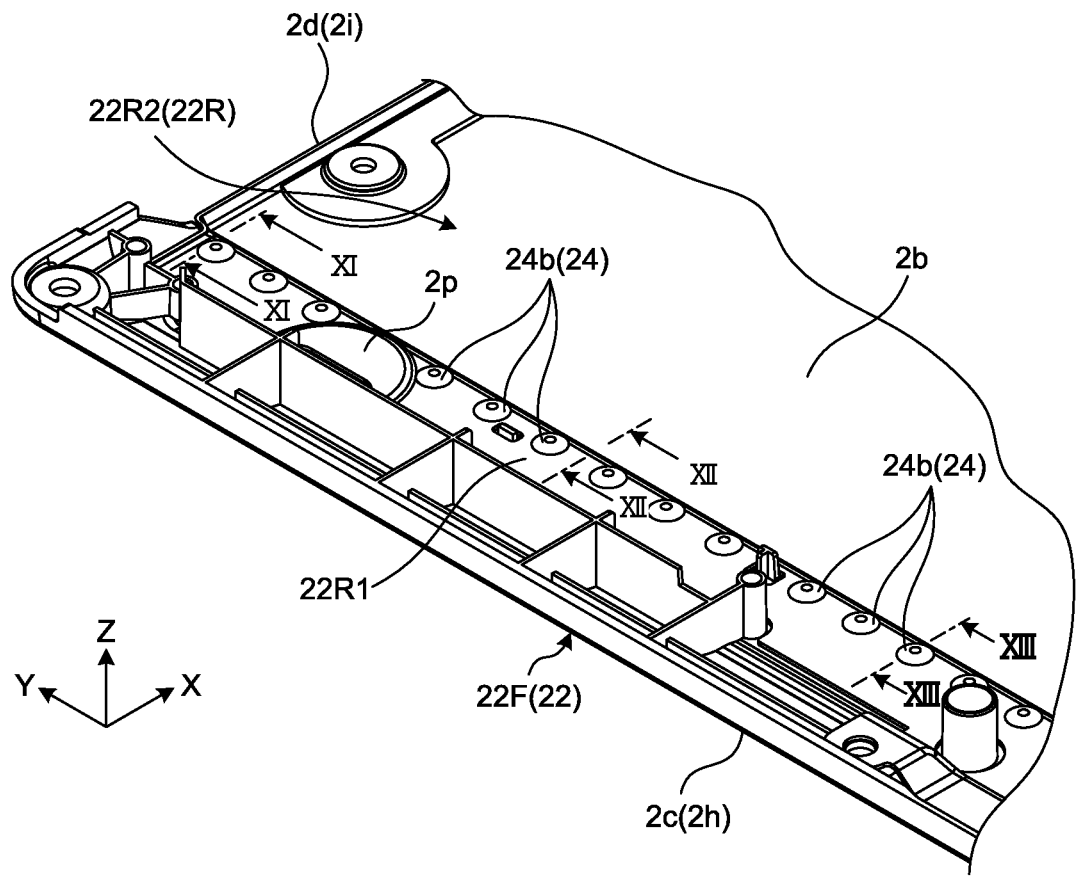
FIG. 10 is a diagram of a state in which the first positioning parts of FIG. 8 are being caulked.
Figure 11:
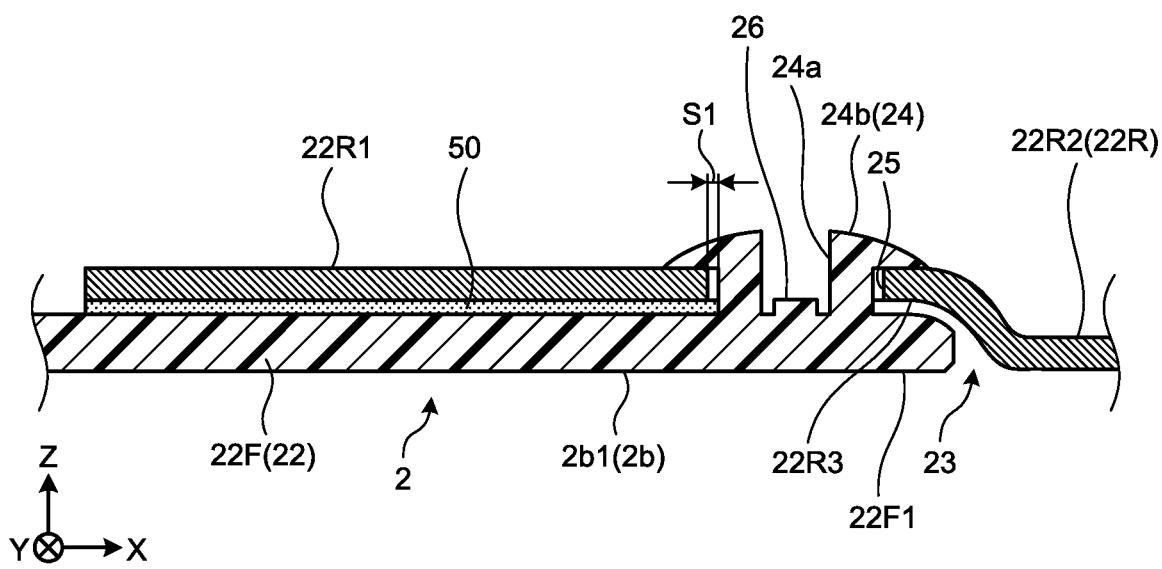
FIG. 11 is a cross section XI-XI for FIG. 10.
Figure 12:
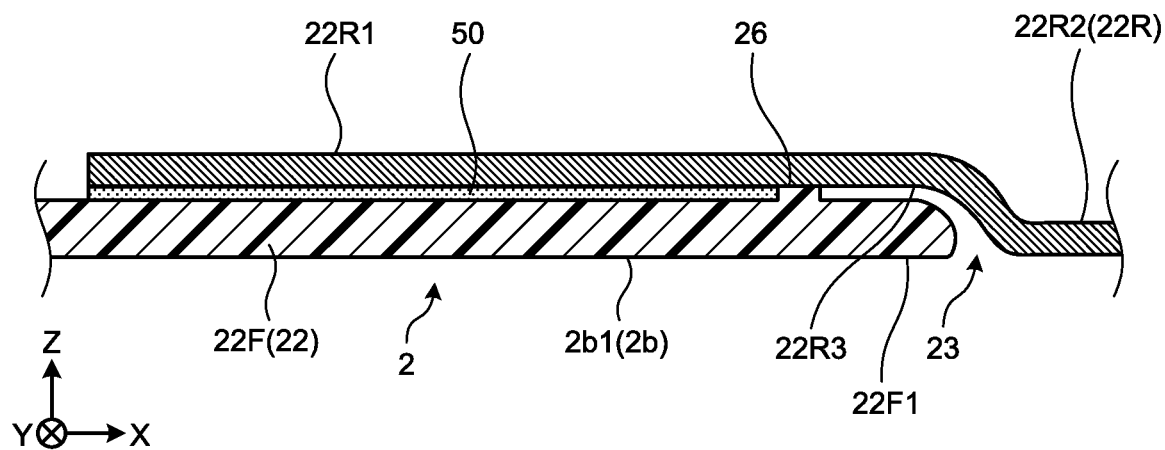
FIG. 12 is a cross section XII-XII for FIG. 10.
Figure 13:
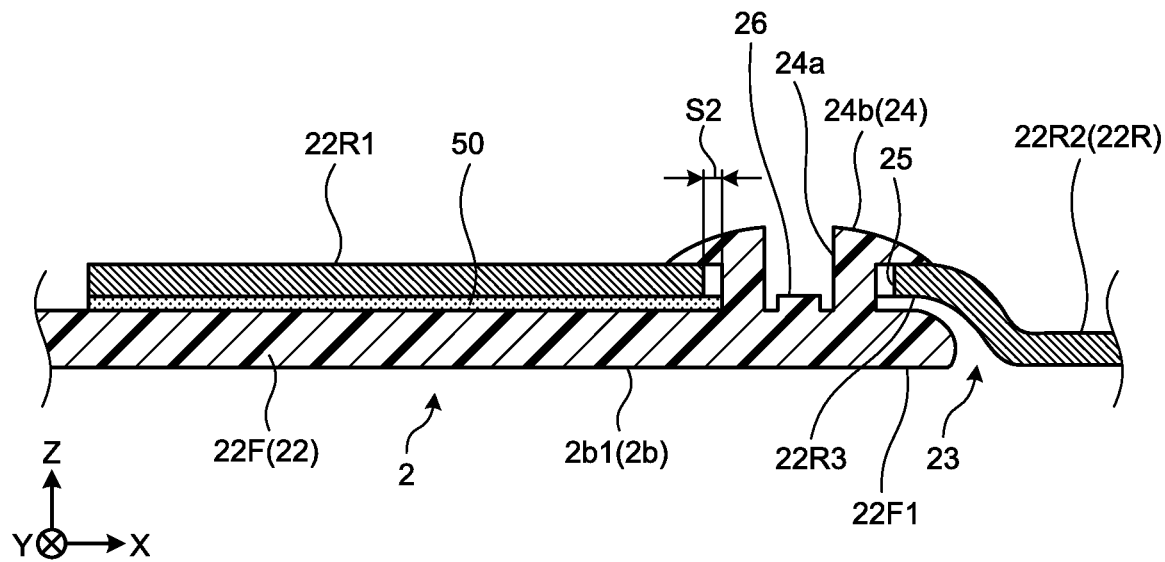
FIG. 13 is a cross section XIII-XIII for FIG. 10.

FIG. 10 is a diagram of a state in which the boss parts 24 of FIG. 8 are being caulked. FIG. 11 is a cross section XI-XI for FIG. 10. FIG. 12 is a cross section XII-XII for FIG. 10. FIG. 13 is a cross section XIII-XIII for FIG. 10. As illustrated in FIG. 10 and FIG. 11, in the present embodiment, for example, the hooking part 24b is formed by caulking the tip end of the boss part 24 by ultrasonic staking and the like.

The hooking part 24b spreads along the first portion 22R1 at a side opposite to the first member 22F of the opening part 25. In other words, the hooking part 24b is provided in a state such that at least a part of the hooking part 24b is overlapped with the first portion 22R1 in the Z direction. The hooking part 24b is formed in a disc shape larger than the diameter of an insertion portion of the boss part 24. The hooking part 24b may be referred to as a caulking part, a joining part, a flange part, and the like.

The adhesive agent 50 is provided between the first member 22F and the first portion 22R1. The adhesive agent 50 is applied on, for example, the first portion 22R1 at an area that is shifted in a direction opposite to the X direction than the opening part 25. In other words, the boss part 24 and the rib 26 (see FIG. 12) are disposed at positions shifted in the X direction from the adhesive agent 50.

In the present embodiment, when the boss part 24 is being caulked (see FIG. 11), or when the first portion 22R1 and the first member 22F come closely into contact with each other before the boss part 24 is being caulked, the adhesive agent 50 spreading in the X direction is held back by the boss part 24 and the rib 26 (see FIG. 9). Therefore, the leakage of the adhesive agent 50 at a boundary part 23 of the first member 22F and the second member 22R is suppressed.

Furthermore, in the present embodiment, a gap S1 (see FIG. 11) between the boss parts 24 disposed at both edges in the Y direction and the opening part 25 is provided to be narrower than a gap S2 (see FIG. 13) between the other boss parts 24 and the opening part 25. The adhesive agent 50 that is held back by the boss part 24 in the X direction and that moves in the Z direction, the adhesive agent 50 that is held back by the rib 26 in the X direction and that is guided along the edge 22F1 (Y direction), or the like enters the gaps S1 and S2. The gap S1 is an example of a "first gap", and the gap S2 is an example of a "second gap".

As described above, in the present embodiment, the base housing 2 includes the boss part 24 (first positioning part), the opening part 25 (second positioning part), and the rib 26 (first rib). The boss part 24 is provided on the edge 22F1 of the first member 22F in the X direction, and projects in the Z direction. The opening part 25 is provided on the first portion 22R1 and positioned with the boss part 24. The rib 26 extends along the edge 22F1 (in Y direction) from the boss part 24, and is interposed between the first member 22F and the first portion 22R1.

With such a configuration, for example, it is possible to hold back the adhesive agent 50 that spreads in the X direction by the boss part 24 and the rib 26 provided on the edge 22F1 of the first member 22F. Consequently, it is possible to easily suppress the leakage of the adhesive agent 50 at the boundary part 23 of the first member 22F and the second member 22R. Moreover, for example, it is possible to apply the adhesive agent 50 closer to the edge 22F1 (boundary part 23) by the boss part 24 and the rib 26. Consequently, it is possible to advantageously increase the boding strength between the first member 22F and the second member 22R.

Moreover, in the present embodiment, the first portion 22R1 is overlapped with the first member 22F in the base housing 2, and the opening part 25 penetrates through the first portion 22R1 in the Z direction. With such a configuration, for example, compared to when the opening part 25 (second positioning part) is a concave part, it is possible to release the adhesive agent 50 to the space inside the base housing 2 via the opening part 25. Consequently, it is possible to further suppress the leakage of the adhesive agent 50 at the boundary part 23.

Furthermore, in the present embodiment, the boss part 24 includes the hooking part 24b that extends along the first portion 22R1 at a side opposite to the first member 22F of the opening part 25. With such a configuration, for example, it is possible to suppress the relative movement of the first member 22F and the second member 22R in the Z direction, by the abutment of the hooking part 24b and the first portion 22R1. Consequently, it is possible to increase the joining strength of the first member 22F and the second member 22R at the edge 22F1 (boundary part 23).

Still furthermore, in the present embodiment, the base housing 2 includes the boss parts 24, the opening parts 25 positioned with the boss parts 24, and the ribs 26 that extend along the edge 22F1 from the boss parts 24. In the base housing 2, the individual boss parts 24 and the individual ribs 26 are alternately provided along the edge 22F1. With such a configuration, for example, because the individual boss parts 24 and the individual ribs 26 are alternately disposed, it is possible to implement the base housing 2 capable of suppressing the leakage of the adhesive agent 50 at the boundary part 23. Moreover, for example, it is possible to release the adhesive agent 50 that is held back by the rib 26 in the X direction and that is guided along the edge 22F1 (Y direction), to the gaps S1 and S2 between the boss part 24 and the opening part 25, or space inside the base housing 2 via the gaps S1 and S2.

Still furthermore, in the present embodiment, the gap S1 (first gap) between one of the boss parts 24 and the opening part 25 is narrower than the gap S2 (second gap) between the other boss part 24 and the opening part 25. With such a configuration, for example, compared to when the size of the gaps S1 and S2 is all the same, it is possible to more easily, more smoothly, or more speedily perform a positioning operation of inserting the boss part 24 into the opening part 25. More particularly, it is possible to enable highly accurate positioning between the boss part 24 and the opening part 25 by the gap S1 with little play. Moreover, for example, it is possible to release more amount of the adhesive agent 50 into the space inside the base housing 2 via the gap S2 with more play or into the gap S2. Furthermore, for example, because more amount of the adhesive agent 50 is accumulated in the gap S2, it is possible to further increase the bonding strength between the first member 22F and the second member 22R.

Still furthermore, in the present embodiment, the electronic device 1 includes the display housing 3 (second housing) and the antenna 5a. The display housing 3 includes the display screen 6a, and is rotatably supported between the closed position P0 (first position) in which the display screen 6a faces the base housing 2 around the rotation centers Ax1 and Ax2 with respect to the base housing 2, and the third developing position P3 (second position) in which the display screen 6a faces a side opposite to the base housing 2. The antenna 5a is stored in the display housing 3, and is overlapped with the first member 22F in the Z direction in a state in which the display housing 3 is set at the third developing position P3. With such a configuration, because the first member 22F is made of a synthetic resin material, for example, even when the display housing 3 is used at the third developing position P3, the antenna 5a can transmit and receive radio waves via the first member 22F.

First Modification

Figure 14:
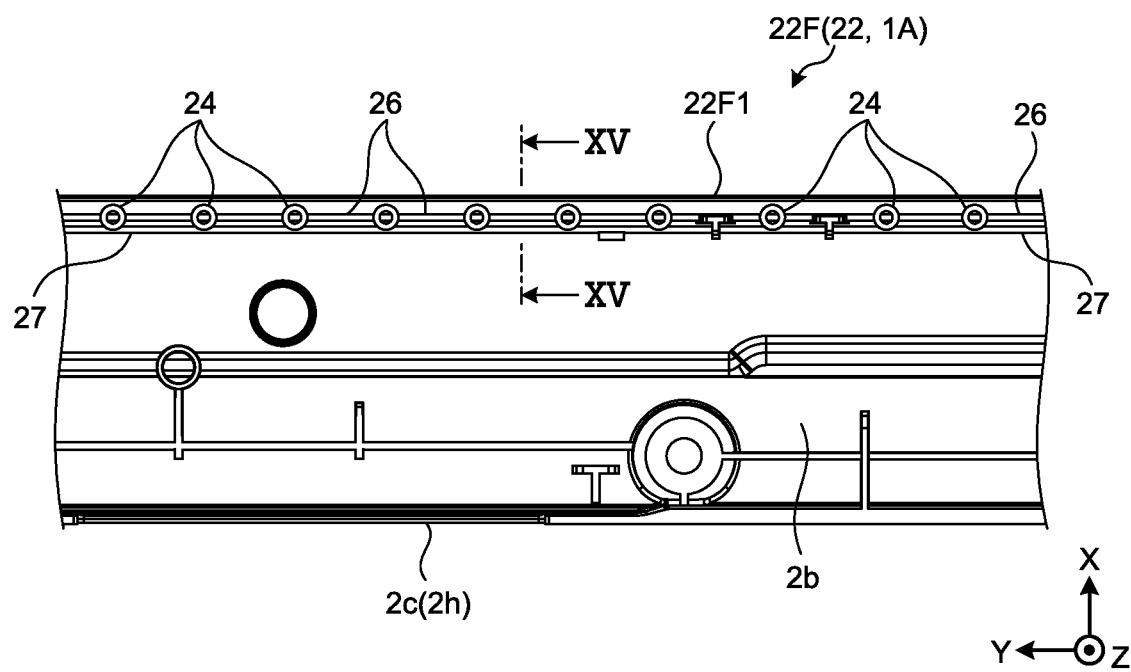
FIG. 14 is an explanatory plan view of a part of the first member on the bottom cover of an electronic device of a first modification.
Figure 15:
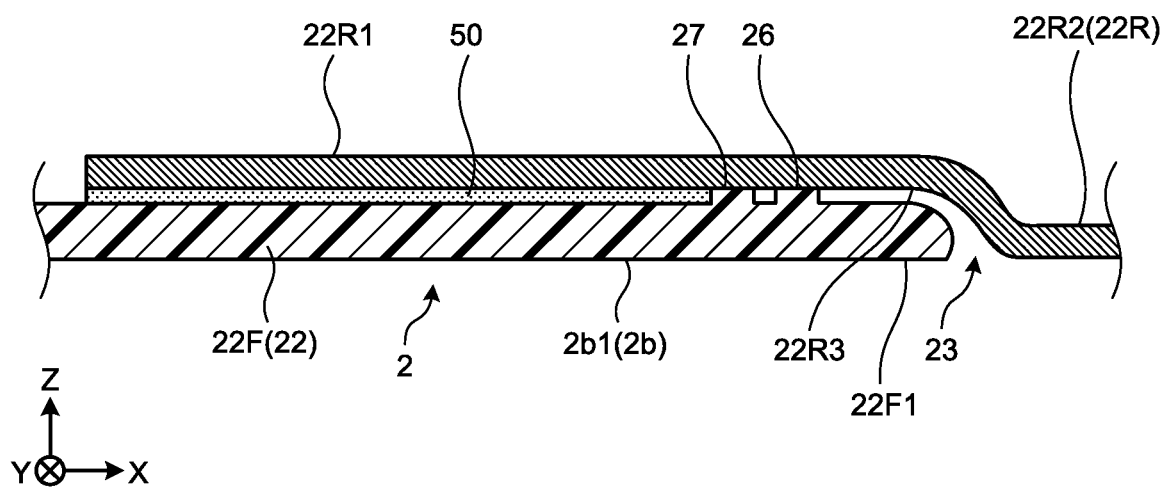
FIG. 15 is a cross section XV-XV for FIG. 14, in which a second member is overlapped on the first member.

FIG. 14 is a plan view of a part of the first member 22F on the bottom cover 22 of an electronic device 1A of a first modification. FIG. 15 is a cross section XV-XV for FIG. 14, in which the second member 22R is overlapped on the first member 22F. The electronic device 1A has the same configuration as that of the electronic device 1 of the above embodiment. Consequently, the electronic device 1A can obtain the same functions and effects as those of the embodiment described above based on the similar configuration.

As illustrated in FIG. 14 and FIG. 15, the present modification is different from the embodiment described above in providing the ribs 26 and ribs 27 arranged side by side in the X direction in the first member 22F. Each of the ribs 27 are disposed in a direction opposite to the X direction of the ribs 26 and extends along the edge 22F1 (in Y direction). In the present modification, the rib 27 is overlapped with a part of the boss part 24, that is, the rib 27 is overlapped, in the Y direction, with an edge of the boss part 24 in a direction opposite to the X direction.

Moreover, as illustrated in FIG. 15, the rib 27 projects in the Z direction from the first member 22F and is interposed between the first member 22F and the first portion 22R1. The height of the rib 27 in the Z direction is substantially the same as the height of the rib 26 in the Z direction. In the present modification, the adhesive agent 50 spreading in the X direction and going over the rib 27 is caught in a space between the rib 26 and the rib 27. The rib 27 is an example of a "second rib".

In this manner, since the rib 27 is provided in the present modification, it is possible to hold back the adhesive agent 50 that spreads in the X direction twice by the two ribs 26 and 27. Consequently, it is possible to further suppress the leakage of the adhesive agent 50 at the boundary part 23 of the first member 22F and the second member 22R.

The number of the ribs 26 and 27 is not limited to that in the example, and three or more ribs may be arranged side by side in the X direction. The ribs 27 may be provided intermittently in the Y direction. Furthermore, at least one of the ribs 26 and 27 may be provided at the first portion 22R1 side, in other words, a side opposite to the boss part 24. The rib 27 may be provided in the X direction of the rib 26 and the boss part 24.

Second Modification

Figure 16:
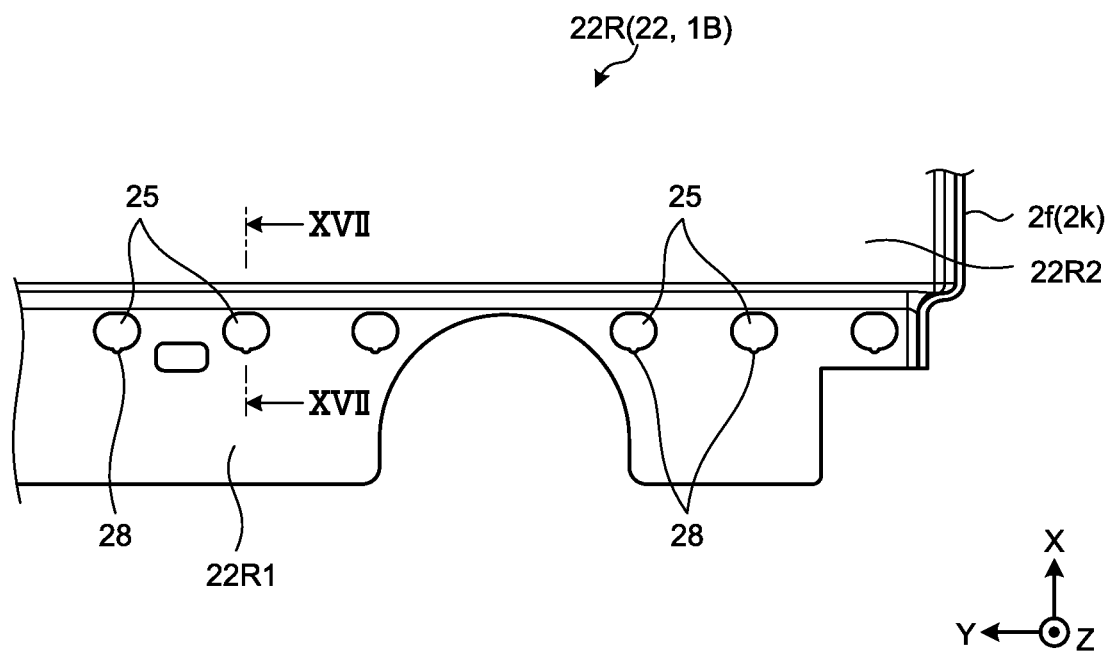
FIG. 16 is an explanatory plan view of a part of the second member on the bottom cover of an electronic device of a second modification.
Figure 17:
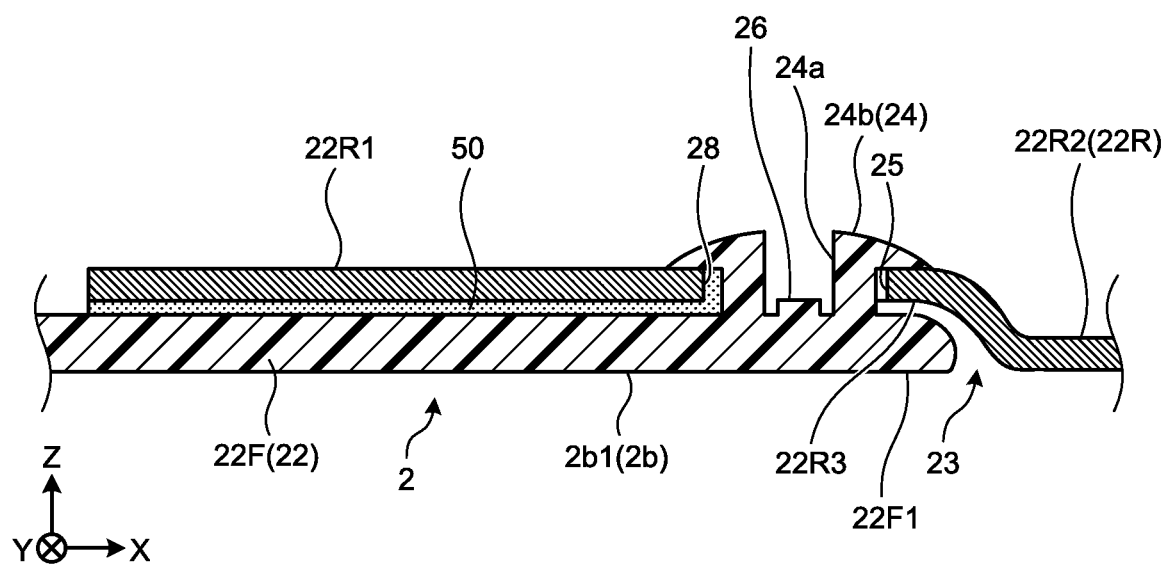
FIG. 17 is a cross section XVII-XVII for FIG. 16, in which the first member is overlapped on the second member.

FIG. 16 is a plan view of a part of the second member 22R on the bottom cover 22 of an electronic device 1B of a second modification. FIG. 17 is a cross section XVII-XVII for FIG. 16, in which the first member 22F is overlapped on the second member 22R. The electronic device 1B has the same configuration as that of the electronic device 1 of the embodiment described above. Consequently, the electronic device 1B can obtain the same functions and effects as those of the embodiment described above based on the similar configuration.

However, as illustrated in FIG. 16 and FIG. 17, the present modification is different from the embodiment described above in providing a notch part 28 at an edge part of the opening part 25 in a direction opposite to the X direction. For example, when viewed in the Z direction, the notch part 28 is formed in a substantially U-shape opened toward the opening part 25. In other words, the notch part 28 is communicated with the opening part 25. Moreover, as illustrated in FIG. 17, the notch part 28 penetrates through the first portion 22R1 in the Z direction.

In this manner, with the present modification, because the notch part 28 is provided, for example, it is possible to release more amount of the adhesive agent 50 into the space inside the base housing 2 via the notch part 28 or into the notch part 28. Thus, for example, it is possible to further suppress the leakage of the adhesive agent 50 at the boundary part 23 of the first member 22F and the second member 22R. Moreover, because more amount of the adhesive agent 50 is accumulated in the notch part 28 (opening part 25), it is possible to further increase the bonding strength between the first member 22F and the second member 22R.

Note that the notch part 28 is not limited to this example, and for example, the notch part 28 may be provided at an edge part of the outer peripheral surface of the boss part 24 in a direction opposite to the X direction, or on both the boss part 24 and the opening part 25. Moreover, a plurality of the notch parts 28 may be provided on an edge part of the opening part 25 and an edge part of the boss part 24, at an interval from each other.

In this manner, the embodiment and modifications of the present invention have been described. However, the embodiment and modifications described above are merely examples, and are not intended to limit the scope of the invention. The embodiment and modifications described above may be performed in various other forms, and various omissions, substitutions, combinations, and changes may be made without departing from the scope and spirit of the invention. The specifications (structure, type, direction, format, size, length, width, thickness, height, number, arrangement, position, material, and the like) of the configurations, the shape, and the like can be suitably modified.

For example, the second material of the second member is not limited to the metal material, and may be a synthetic resin material and the like different from the first material of the first member.

What is claimed is:

1. A housing of an electronic device, the housing comprising:
a first member that is part of an outer wall of the housing;
a second member that is another part of the outer wall and includes:
a first portion that overlaps the first member in a first direction intersecting with the outer wall, wherein the first portion is joined to the first member via an adhesive agent; and
a second portion disposed at a different position from the first member in a second direction intersecting with the first direction;
a first positioning part disposed at an edge of the first member and projects in the first direction, wherein the edge is disposed in the second direction on the first member;
a second positioning part into which the first positioning part is inserted, wherein the second positioning part is disposed at the first portion of the second member; and
a first rib that extends from the first positioning part along the edge of the first member, wherein the first rib is interposed between the first member and the first portion of the second member, wherein the first rib is connected to an outer peripheral surface of the first positioning part.

2. The housing according to claim 1, wherein
the first portion of the second member overlaps the first member inside the housing, and
the second positioning part is an opening part that penetrates through the first portion of the second member in the first direction.

3. The housing according to claim 2, wherein the first positioning part includes a hooking part that extends along the first portion of the second member at an opposite side to the first member of the opening part.

4. The housing according to claim 1, further comprising:
a plurality of the first positioning parts,
a plurality of the second positioning parts into which the first positioning parts are individually inserted, and
a plurality of the first ribs that extend along an end part from the first positioning parts,
wherein the individual first positioning parts and the individual first ribs are alternately disposed along the edge of the first member.

5. The housing according to claim 4, wherein a first gap between one of the first positioning parts and the corresponding second positioning part is narrower than a second gap between the other first positioning parts and the corresponding other second positioning parts.

6. The housing according to claim 4, wherein each of the plurality of the first ribs is disposed across two adjacent ones of the plurality of the first positioning parts.

7. The housing according to claim 1, further comprising a second rib that is disposed on either the second direction or a direction opposite the second direction of the first rib, wherein the second rib extends along the edge of the first member and is interposed between the corresponding first member and the corresponding first portion of the second member.

8. The housing according to claim 1, further comprising a notch part disposed at an edge of the first positioning part or an edge of the second positioning part, wherein each edge is in a direction opposite the second direction.

9. An electronic device comprising:
a first housing that is the housing according to claim 1;
a second housing that comprises a display screen and is supported to allow rotation around rotation centers with respect to the first housing between a first position and a second position, wherein the first position is a position in which the display screen faces the first housing, and the second position is a position in which the display screen faces an opposite side to the first housing; and
an antenna disposed in the second housing to overlap with the first member in the first direction in a state where the second housing is in the second position,
wherein the first member is made of a synthetic resin material.

* * * * *